J. R. BIBBINS.
CALORIMETER.
APPLICATION FILED AUG. 7, 1906.
1,055,699.
Patented Mar. 11, 1913.
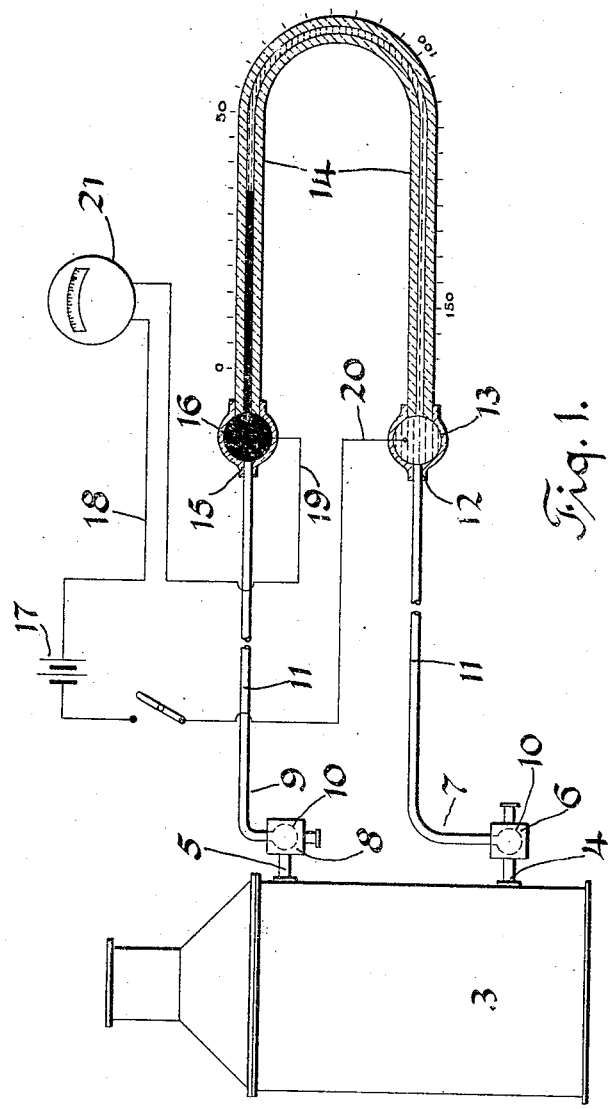
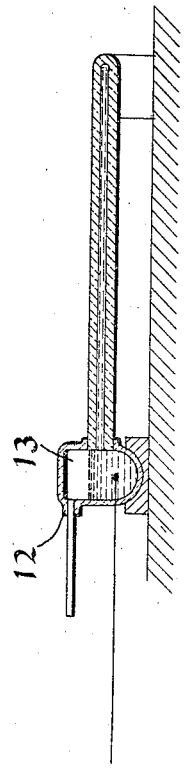
WITNESSES:
INVENTOR.
J. R. Bibbins.
BY
His ATTORNEY.

UNITED STATES PATENT OFFICE.

JAMES R. BIBBINS, OF PITTSBURGH, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

CALORIMETER.

1,055,699.  Specification of Letters Patent.  Patented Mar. 11, 1913.

Application filed August 7, 1906. Serial No. 329,584.

*To all whom it may concern:*

Be it known that I, JAMES ROWLAND BIBBINS, a citizen of the United States, and a resident of Pittsburgh, in the county of Allegheny and State of Pennsylvania, have made a new and useful Invention in Calorimeters, of which the following is a specification.

This invention relates to calorimeters and more particularly to indicating or recording apparatus for calorimeters.

An object of this invention is the production of an apparatus which may be utilized with various types of calorimeters and which will indicate or record the number of thermal units per cubic foot of the gas tested and thereby eliminate the necessity of tedious observations and computations. This and other objects I obtain with an apparatus embodying the features herein described and illustrated.

In the drawings accompanying this application and forming a part thereof, Figure 1 illustrates, somewhat diagrammatically, an apparatus embodying my invention, a portion of the apparatus being shown in elevation and a portion in plan for convenience of illustration; and Fig. 2 is a side view of a detail of my invention.

While I have illustrated my invention in connection with a differential and pressure type of calorimeter, I desire it to be specifically understood that I do not limit its application to any specific type of calorimeter, as it will be apparent to those skilled in the art that it is equally applicable to calorimeters employing the expansive force of a heat-responsive agent as a means of indicating the calorific value of the gas or other fuel material tested.

Referring to Figs. 1 and 2: A calorimeter 3, which has the customary form of combustion chamber, is provided with a water inlet port 4 and an outlet port 5. As is customary the water entering the calorimeter is conducted into close proximity with the combustion chamber so that it may absorb the heat developed by the combustion of the material or fuel tested. A receptacle or receiver 6, interposed between the source of water supply and the port 4, is arranged to receive a thermometer 7. A receptacle 8 receives the water discharged from the port 5 and is provided with a thermometer 9.

The thermometers 7 and 9 each consists of a bulb 10 and an integrally-formed tube 11. The tube 11 of the thermometer 7 communicates through a port 12 with a receptacle 13 and the tube of the thermometer 9 communicates through a port 15 with a receptacle 16. The receptacle 13 is partially filled with a high electrical resistance liquid and the receptacle 16 is partially filled with a low resistance liquid, such as mercury. The ports 12 and 15 are located above the surface of the liquid contained in their respective receptacles.

A U-shaped capillary tube 14 connects the receptacles 13 and 16 and is so arranged that it communicates with each receptacle below the surface of the liquid contained by them. The thermometers 7 and 9 are air or gas thermometers and with the receptacles 13 and 16 and the tube 14 form a closed system, all the joints being hermetically sealed.

The bulbs 10 of the thermometers are of such size, relative to the volume of the interior of the tubes 11, that the accuracy of the thermometers in registering the variations of temperature of the water is not materially affected by the variations in volume of the fluid in the tubes.

The tube 14 is partially filled with high resistance liquid from the receptacle 13 and the remainder with mercury from the receptacle 16. Variations in the temperature of the water entering the calorimeter through the port 4 cause variations in density of the air in the bulb 10 of the thermometer 7 and consequently variations of air pressure above the liquid in the receptacle 13. Variations of temperature in the water discharged from the calorimeter likewise cause variations of pressure above the mercury in the receptacle 16. As the temperature of the water discharged from the calorimeter increases above that of the water entering the calorimeter, the air pressure in the receptacle 16 predominates over the pressure in the receptacle 13 and mercury is forced into the tube 14, the high resistance fluid which is displaced being forced back into the receptacle 13. As the temperature of the water discharged from the calorimeter decreases, the length of the column of mercury proportionately decreases and the air pressure in the receptacle 13 forces the high resistance liquid into the tube 14 to take the place of the receding mercury. With such an arrangement the variations in temperature of the water entering and leaving the calorimeter cause the point of contact of mercury and high resistance liquid in the tube 14 to fluctuate. The tube 14 is graduated into segments of equal length and the high resistance liquid and the mercury are so arranged that the point of contact of the mercury and the high resistance fluid in the tube will stand opposite the zero graduation when the pressure in each of the receptacles 13 and 16 is equal.

A primary or other cell 17 of constant discharge characteristics, or some other source of constant electromotive force is connected into an electric circuit which includes an electric meter or current indicating device 21, the mercury receptacle 16, the tube 14 and the high resistance liquid receptacle 13. The battery 17 is connected to a terminal of the meter or indicating device 21 by a wire 18. The other terminal of the indicating device is connected with the mercury in the receptacle 16 by a wire 19 and the high resistance liquid in the receptacle 13 is connected to the battery 17 by a wire 20.

The operation of the recording device is as follows: Variations in temperature of the water entering and leaving the calorimeter cause variations in pressure in the receptacle 16 and, as has been described, variations in the position of the point of contact between the mercury and the high resistance liquid in the tube 14 in accordance with the pressure in their respective receptacles. Since the point of contact occupies the zero position when the pressures in the receptacles are equal, any increase in the length of the mercury column will indicate an increase of pressure in the receptacle 16 above that in the receptacle 13 and since the pressures are directly proportional to the temperatures of the air in the bulbs 10 of the thermometers, the mercury column will increase and decrease in length in accordance with the variations in temperature of the water leaving the calorimeter. The wires connecting the receptacles 16 and 13 to the battery 17 are of such cross-sectional area that their resistance is negligible. The relative resistance of the mercury is also negligible and the arrangement is such that the resistance introduced into the circuit is directly proportional to the length of the column of high resistance liquid in the tube 14. The contact between the mercury and the high resistance liquid acts as a frictionless rheostat arm and the amount of resistance in the circuit is directly proportional to the difference of temperature between the water entering and leaving the calorimeter. The differential effects of gravity do not have to be reckoned with since the levels of the liquid in the receptacles 13 and 16 are practically constant, owing to their large volume as compared with that of the tube 14. The graduations of the tube 14 may indicate differences of pressure, temperature or B. T. Us.

The electric meter 21, which indicates the amount of current flowing through the circuit, is graduated in British thermal units per cubic foot of gas, as the resistance in the circuit varies in direct proportion to the differences of temperature as recorded by the thermometers.

With the differential arrangement of the thermometers, it is not necessary to measure the absolute temperature of the water entering and leaving the calorimeter, as the circuit is a closed or balanced circuit. The instrument, therefore, is only sensitive to differences of temperature and the labor and inaccuracies involved in reading temperatures are avoided.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In combination with a calorimeter, an electric circuit including a source of constant potential, and electrical devices included in said circuit for indicating, in thermal units, the amount of heat developed in said calorimeter, a variable electrical resistance comprising a tube included in said circuit and provided with a high resistance liquid receptacle at one end and a low resistance liquid receptacle at the other end, and means, responsive to the temperature variations in said calorimeter, for varying the amount of resistance included in said circuit by varying the length of the column of high resistance liquid in said tube.

2. In combination with a calorimeter, an electrical device for indicating the amount of heat developed in the calorimeter, an electric circuit in which said device is located, a variable electrical resistance in said circuit and comprising a tube provided with a high resistance liquid receptacle at one end and a low resistance liquid receptacle at the other end, and means, responsive to temperature variations in said calorimeter, for varying the amount of resistance included in said circuit, by varying the length of the high resistance liquid column in said tube.

3. In an indicating device for calorimeters, an electric circuit including a source of constant potential, a meter and a variable resistance device comprising a tube provided with a high resistance liquid receptacle at one end and a low resistance liquid receptacle at the other end, fluid thermometers sensitive to the amount of heat developed in said calorimeters and arranged to vary the amount of resistance included in said circuit by varying the relative lengths of the columns of liquid in said tube.

In testimony whereof, I have hereunto subscribed my name this 4th day of August 1906.

JAMES R. BIBBINS.

Witnesses:
CHARLES W. MCGHEE,
R. P. MCINTYRE.